United States Patent
Gotman et al.

(10) Patent No.: US 9,813,177 B2
(45) Date of Patent: Nov. 7, 2017

(54) DATA-MODULATED PILOTS FOR PHASE AND GAIN DETECTORS

(71) Applicant: QUALCOMM Incorporated, San Diego, CA (US)

(72) Inventors: Maxim Gotman, Kfar-Saba (IL); Ronen Greenberger, Modi'in (IL); Ziv Alina, Tel-Aviv (IL)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 15/074,213

(22) Filed: Mar. 18, 2016

(65) Prior Publication Data
US 2016/0204888 A1    Jul. 14, 2016

Related U.S. Application Data

(63) Continuation of application No. 14/132,648, filed on Dec. 18, 2013, now Pat. No. 9,313,059.
(Continued)

(51) Int. Cl.
*H04J 9/00*        (2006.01)
*H04L 27/00*       (2006.01)
(Continued)

(52) U.S. Cl.
CPC ............ *H04J 9/00* (2013.01); *H04B 14/002* (2013.01); *H04L 1/0003* (2013.01); *H04L 1/005* (2013.01);
(Continued)

(58) Field of Classification Search
CPC ............ H04L 27/2647; H04L 1/0003; H04L 2027/0067; H04L 25/067; H04L 5/005;
(Continued)

(56) References Cited

U.S. PATENT DOCUMENTS 5,703,873 A    12/1997    Ojanpera et al.
5,940,450 A    8/1999    Koslov et al.
(Continued)

FOREIGN PATENT DOCUMENTS

CN    1317185 A    10/2001
JP    H10243042 A    9/1998
(Continued)

OTHER PUBLICATIONS

ISA/EPO, International Search Report and the Written Opinion of the International Searching Authority, Int'l App. No. PCT/US2013/077164, Apr. 30, 2014, European Patent Office, Rijswijk, NL 13 pgs.

*Primary Examiner* — Vineeta Panwalkar
(74) *Attorney, Agent, or Firm* — Holland & Hart LLP

(57) ABSTRACT

Methods, systems, and devices are described for mitigating an unwanted increase in a coding rate of a wireless communication signal. A plurality of symbols including a transmitted codeword is received. The plurality of symbols including a first group of data symbols with a first modulation and coding scheme and a second group of data modulated pilot symbols with a second modulation and coding scheme. Applicable demodulation schemes are adaptively switched for each group of the plurality of symbols. The second group of data modulated pilot symbols are used in lieu of pilot symbols. The second modulation and coding scheme is a more reliable modulation and coding scheme than the first modulation and coding scheme.

15 Claims, 10 Drawing Sheets

Related U.S. Application Data

(60) Provisional application No. 61/745,484, filed on Dec. 21, 2012.

(51) Int. Cl.
  *H04B 14/00* (2006.01)
  *H04L 5/00* (2006.01)
  *H04W 72/08* (2009.01)
  *H04L 25/06* (2006.01)
  *H04L 1/00* (2006.01)
  *H04L 27/22* (2006.01)
  *H04L 27/38* (2006.01)

(52) U.S. Cl.
  CPC ............ *H04L 1/0086* (2013.01); *H04L 5/005* (2013.01); *H04L 5/006* (2013.01); *H04L 25/067* (2013.01); *H04L 27/0008* (2013.01); *H04W 72/082* (2013.01); *H04L 1/0016* (2013.01); *H04L 27/22* (2013.01); *H04L 27/38* (2013.01); *H04L 2027/003* (2013.01); *H04L 2027/0055* (2013.01); *H04L 2027/0067* (2013.01); *H04L 2027/0085* (2013.01)

(58) Field of Classification Search
  CPC ........... H04L 2025/0342; H04L 5/0051; H04L 27/0008; H04L 5/006; H04L 1/0086; H04L 1/0016; H04L 2027/003; H04L 27/38; H04L 27/22; H04L 1/005; H04N 5/44; H04N 5/455; H04N 5/46; H04J 9/00; H04W 72/082; H04B 14/002
  See application file for complete search history.

(56) References Cited

U.S. PATENT DOCUMENTS

| | | | |
|---|---|---|---|
| 7,697,466 | B2 | 4/2010 | Hashimoto et al. |
| 8,160,175 | B2 | 4/2012 | Von Elbwart et al. |
| 8,520,747 | B2 | 8/2013 | Sampath et al. |
| 8,913,695 | B2 | 12/2014 | Malladi et al. |
| 2004/0120304 | A1 | 6/2004 | Kloos et al. |
| 2004/0202142 | A1 | 10/2004 | Batariere et al. |
| 2005/0002444 | A1 | 1/2005 | Wei et al. |
| 2010/0040120 | A1* | 2/2010 | Sharma ............ H04W 52/0229 375/219 |
| 2011/0116569 | A1 | 5/2011 | Vaughan et al. |
| 2012/0058730 | A1 | 3/2012 | Jitsukawa et al. |
| 2013/0235919 | A1 | 9/2013 | Plevel |
| 2014/0177762 | A1 | 6/2014 | Gotman et al. |

FOREIGN PATENT DOCUMENTS

| | | |
|---|---|---|
| JP | 2002359607 A | 12/2002 |
| JP | 2005073303 A | 3/2005 |
| JP | 2007028160 A | 2/2007 |
| JP | 2007028161 A | 2/2007 |
| JP | 2008536378 A | 9/2008 |
| JP | 2009171457 A | 7/2009 |
| JP | 4982177 B2 | 7/2012 |
| WO | WO-2004093365 A2 | 10/2004 |
| WO | WO-2006102909 A1 | 10/2006 |
| WO | WO-2008112803 A2 | 9/2008 |
| WO | WO-2009117254 A2 | 9/2009 |

* cited by examiner

DATA-MODULATED PILOTS FOR PHASE AND GAIN DETECTORS

CROSS REFERENCES

The present application for patent is a continuation of U.S. patent application Ser. No. 14/132,648 by Gotman et al., entitled "Data-Modulated Pilots for Phase and Gain Detectors," filed Dec. 18, 2013; which claims priority to U.S. Provisional Patent Application No. 61/745,484 by Gotman et al., entitled "Data-Modulated Pilots for Phase and Gain Detectors," filed Dec. 21, 2012; each of which is assigned to the assignee hereof and expressly incorporated by reference herein.

BACKGROUND

The following relates generally to wireless communication, and more specifically to phase detection and coding gains. Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

Generally, a wireless multiple-access communications system may include a number of base stations, each simultaneously supporting communication for multiple mobile devices. Base stations may communicate with mobile devices on downstream and upstream links. Each base station has a coverage range, which may be referred to as the coverage area of the cell. A transmitter (e.g., a base station) and a receiver (e.g., a mobile device) may include, respectively, components for signal transmissions and signal reception. For example, the transmitter and receiver may each include one or more oscillators. These oscillators may not be in sync with one another, and may have inherent imperfections. As a result, phase noise may be introduced into the received signal. This noise may create difficulties for the receiver to correctly determine the phase for symbols transmitted to the receiver. Currently, phase error is determined by performing hard decisions on the received symbols themselves. However, due to the noisy conditions at the receiver, this hard decision may regularly be incorrect. To improve hard decisions, known pilot sequences are inserted into a stream of data symbols. The use of pilot sequences however, reduces the number of symbols that are available to carry data. Thus, the coding rate of the data stream is increased in order to maintain a desired level of data throughput.

SUMMARY

Methods, systems, and devices are described for mitigating an unwanted increase in a coding rate of a wireless communication signal. A plurality of symbols including a transmitted codeword is received. The plurality of symbols including a first group of data symbols with a first modulation and coding scheme and a second group of data modulated pilot symbols with a second modulation and coding scheme. The second group of data modulated pilot symbols are used in lieu of pilot symbols. By replacing pilot symbols with symbols that carry data, an undesirable increase in the coding rate of the plurality of symbols is mitigated at the transmitter and the desired data throughput is not sacrificed.

At the receiver, applicable demodulation schemes are adaptively switched for each group of the plurality of symbols. The second modulation and coding scheme is a more reliable modulation and coding scheme than the first modulation and coding scheme. In addition, a priori LLRs may be generated for each symbol of the received plurality of symbols, whereas LLRs may not be generated for pilot symbols in a data stream. The additional LLRs may improve the performance of a decoder to decode the transmitted codeword.

A method to mitigate an unwanted increase in a coding rate of a wireless communication signal is described. A plurality of symbols including a transmitted codeword may be received. The plurality of symbols may include a first group of data symbols with a first modulation and coding scheme and a second group of data modulated pilot symbols with a second modulation and coding scheme. An adaptive switching between applicable demodulation schemes for each group of the plurality of symbols may occur.

In one configuration, the second group of data modulated pilot symbols may be used in lieu of pilot symbols. A carrier phase error may be determined based at least in part on the second group of data modulated pilot symbols. The second modulation and coding scheme may be a more reliable modulation and coding scheme than the first modulation and coding scheme.

Adaptively switching between the demodulation schemes may include determining, for each symbol, whether the symbol occurs when a pilot symbol is expected to occur. Upon determining that the symbol does not occur when a pilot symbol is expected to occur, a first look-up table or a first non-LUT function for the first modulation and coding scheme may be used to perform hard decision decoding of the symbol. Upon determining that the symbol does occur when a pilot symbol is expected to occur, a second look-up table or a second non-LUT function for the second modulation scheme may be used to perform hard decision decoding of the symbol.

In one example, phase errors for each symbol of the plurality of received symbols may be generated using the results of the hard decision decoding. Phase corrections for each symbol of the plurality of received symbols may be generated based on the generated phase errors.

The symbols of the plurality of received symbols may be derotated according to generated phase corrections for the symbols. A plurality of a priori log-likelihood ratios (LLRs) may be generated from the plurality of phase corrected received symbols. The plurality of LLRs may represent a plurality of bits of the transmitted codeword. Generating the plurality of a priori LLRs may include determining, for each phase corrected symbol, whether the phase corrected symbol occurs when a pilot symbol is expected to occur. Upon determining that the phase corrected symbol does not occur when a pilot symbol is expected to occur, a first number of a priori LLRs may be generated from the phase corrected symbol. Upon determining that the phase corrected symbol does occur when a pilot symbol is expected to occur, a second number of a priori LLRs may be generated from the phase corrected symbol. The second number of LLRs may be less than the first number of LLRs.

In one embodiment, the plurality of a priori LLRs may be fed to a decoder to decode the transmitted codeword. A plurality of soft a posteriori LLRs may be collected at the output of the decoder. The soft LLRs may represent the plurality of bits of the transmitted codeword.

In one configuration, the plurality of received symbols may be a digitized representation of at least a portion of a wireless communication signal. The first modulation scheme may be 1024 Quadrature Amplitude Modulation (QAM). The second modulation scheme may be 64 QAM.

A receiving device configured to mitigate an unwanted increase in a coding rate of a wireless communication signal is also described. The device may include a processor and memory in electronic communication with the processor. Instructions may be stored in the memory. The instructions may be executable by the processor to receive a plurality of symbols including a transmitted codeword. The plurality of symbols may include a first group of data symbols with a first modulation and coding scheme and a second group of data modulated pilot symbols with a second modulation and coding scheme. The second group of data modulated pilot symbols may be used in lieu of pilot symbols. The instructions may also be executable by the processor to adaptively switch between applicable demodulation schemes for each group of the plurality of symbols.

An apparatus to mitigate an unwanted increase in a coding rate of a wireless communication signal is also described. The apparatus may include means for receiving a plurality of symbols including a transmitted codeword. The plurality of symbols may include a first group of data symbols with a first modulation and coding scheme and a second group of data modulated pilot symbols with a second modulation and coding scheme. The second group of data modulated pilot symbols may be used in lieu of pilot symbols. The apparatus may further include means for adaptively switching between applicable demodulation schemes for each group of the plurality of symbols.

A computer program product for mitigating an unwanted increase in a coding rate of a wireless communication signal is also described. The computer program product may include a non-transitory computer-readable medium storing instructions executable by a processor to receive a plurality of symbols including a transmitted codeword. The plurality of symbols may include a first group of data symbols with a first modulation and coding scheme and a second group of data modulated pilot symbols with a second modulation and coding scheme. The second group of data modulated pilot symbols may be used in lieu of pilot symbols. The instructions may be executable by the processor to adaptively switch between applicable demodulation schemes for each group of the plurality of symbols.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Methods, systems, and devices are described for mitigating an unwanted increase in a coding rate of a wireless communication signal. In one example, a plurality of symbols comprising a transmitted codeword is received. The plurality of symbols may include a first group of data symbols with a first modulation and coding scheme and a second group of data modulated pilot symbols with a second modulation and coding scheme. As the first group and second group of symbols are demodulated in a receiver, different demodulation schemes are adaptively used for each group of the plurality of symbols. In one example, the second group of data modulated pilot symbols are used in lieu of pilot symbols (e.g., reference signals) in a data stream. The second modulation and coding scheme may be a more reliable modulation and coding scheme than the first modulation and coding scheme. By using available symbols to carry data, instead of replacing these data symbols with pilot symbols, the coding rate applied to a data stream may be reduced without sacrificing data throughput.

Figure 1:
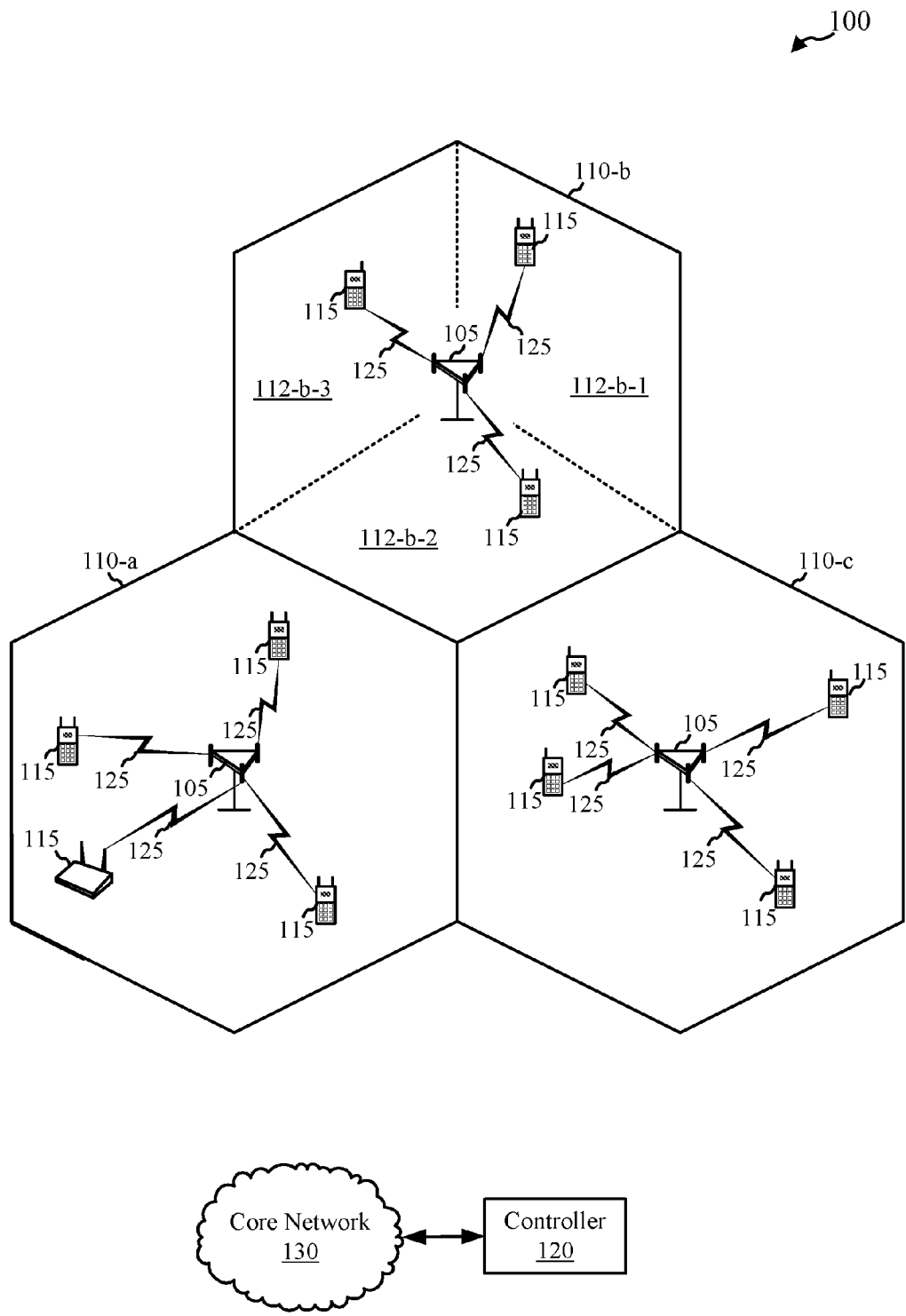
FIG. 1 shows a block diagram of a wireless communications system.

Referring first to FIG. 1, a block diagram illustrates an example of a wireless communications system 100. The system 100 includes base stations 105 (or cells), communication devices 115, a base station controller 120, and a core network 130 (the base station controller 120 may be integrated into the core network 130). The system 100 may support operation on multiple carriers (waveform signals of different frequencies). Multi-carrier transmitters can transmit modulated signals simultaneously on the multiple carriers. For example, each modulated signal may be a multi-carrier channel modulated according to the various radio technologies described above. Each modulated signal may be sent on a different carrier and may carry control information (e.g., pilot signals, control channels, etc.), overhead information, data, etc. The system 100 may be a multi-carrier LTE network capable of efficiently allocating network resources. In some cases, the system 100 may support operation using a single carrier. The system 100 may be a network capable of operating using time division multiplexing (TDM), time division multiple access (TDMA), frequency division multiple access (FDMA), single-carrier FDMA (SC-FDMA), code division multiple access (CDMA), or orthogonal frequency division multiple access (OFDMA).

The base stations 105 may wirelessly communicate with the devices 115 via a base station antenna (not shown). The base stations 105 may communicate with the devices 115 under the control of the base station controller 120 via multiple carriers. Each of the base station 105 sites may provide communication coverage for a respective geographic area. In some embodiments, base stations 105 may be referred to as a base transceiver station, a radio base station, an access point, a radio transceiver, a basic service set (BSS), an extended service set (ESS), a NodeB, eNodeB (eNB), Home NodeB, a Home eNodeB, or some other suitable terminology. The coverage area for each base station 105 here is identified as 110-a, 110-b, or 110-c. The coverage area for a base station may be divided into sectors making up only a portion of the coverage area (e.g., sectors 112-b-1, 112-b-2, 112-b-3, etc.). The system 100 may include base stations 105 of different types (e.g., macro, micro, and/or pico base stations). There may be overlapping coverage areas for different technologies. A macro base station may provide communication coverage for a relatively large geographic area (e.g., 35 km in radius). A pico base station may provide coverage for a relatively small geographic area (e.g., 12 km in radius), and a femto base station may provide communication coverage for a relatively smaller geographic area (e.g., 50 m in radius). There may be overlapping coverage areas for different technologies.

The devices 115 may be dispersed throughout the coverage areas 110. Each device 115 may be stationary or mobile. In one configuration, the devices 115 may be able to communicate with different types of base stations such as, but not limited to, macro base stations, pico base stations, and femto base stations, via link 125. The devices 115 may be referred to as mobile stations, mobile devices, access terminals (ATs), user equipments (UEs), subscriber stations (SSs), or subscriber units. The devices 115 may include cellular phones and wireless communications devices, but may also include personal digital assistants (PDAs), other handheld devices, netbooks, notebook computers, tablet computers, etc.

In one example, the base station controller 120 may be coupled to a set of base stations and provide coordination and control for these base stations 105. The base station controller 120 may communicate with the base stations 105 via a backhaul (e.g., core network 130). The base stations 105 may also communicate with one another directly or indirectly and/or via wireless or wireline backhaul.

Various components of the devices 115 may add interference (i.e., noise) to a received signal. For example, phase noise may be introduced by frequency oscillators within the devices 115. A digital phase-locked loop (DPLL) may be used in the modem's receive path of the devices 115 for carrier wave recovery. The DPLL may track the carrier frequency and phase and estimate phase corrections to apply on a plurality of received symbols. The DPLL may be fed with phase errors produced by a phase detector (PD). The phase errors may be produced by comparing the actual phases of a plurality of received symbols with the expected phases of a plurality of ideal reference symbols. In some cases, the phase errors are calculated independently for each symbol. The phase errors may be calculated as a group for a plurality of symbols. In a data aided implementation, where there is no a priori knowledge of the transmitted symbols, the best estimation of the reference symbols is a hard decision taken on the current soft symbols (as a closest constellation point).

Since this part of the modem is susceptive to noisy conditions (both thermal and phase noise), the PD may produce a relatively high rate of erroneous hard decisions yielding degradation in the performance of the PD, which may lead to a decrease in the performance of the DPLL. This may result in the degradation of the overall performance of the modem of a device 115. In one example, a sequence of erroneous hard decisions may cause the DPLL to lose track of the carrier's phase or frequency. In one embodiment, pilot symbols may be inserted into the signal to reduce the likelihood of producing incorrect hard decisions. In one configuration, the PD may have a priori knowledge of the transmitted symbol representing a received pilot symbol. As a result, when a pilot symbol occurs in the signal, the PD may compare the received symbol (i.e., the pilot symbol) with a correct presumption of the corresponding transmitted symbol when calculating the phase error. Thus, the denser the pilot pattern is in a signal, the likelihood of the DPLL losing track of the carrier's phase or frequency may be reduced. However, using a denser pattern of pilot symbols may reduce the data throughput since pilot symbols may occupy allocations of data symbols of the signal. As a result, in order to maintain a consistent data throughput, the coding rate of the signal may be increased. In one embodiment, the present systems and methods may use data modulated pilot symbols in lieu of pilot symbols. These symbols may reduce the likelihood of hard decision errors produced by the DPLL while maintaining a certain level of data throughput.

Figure 2:
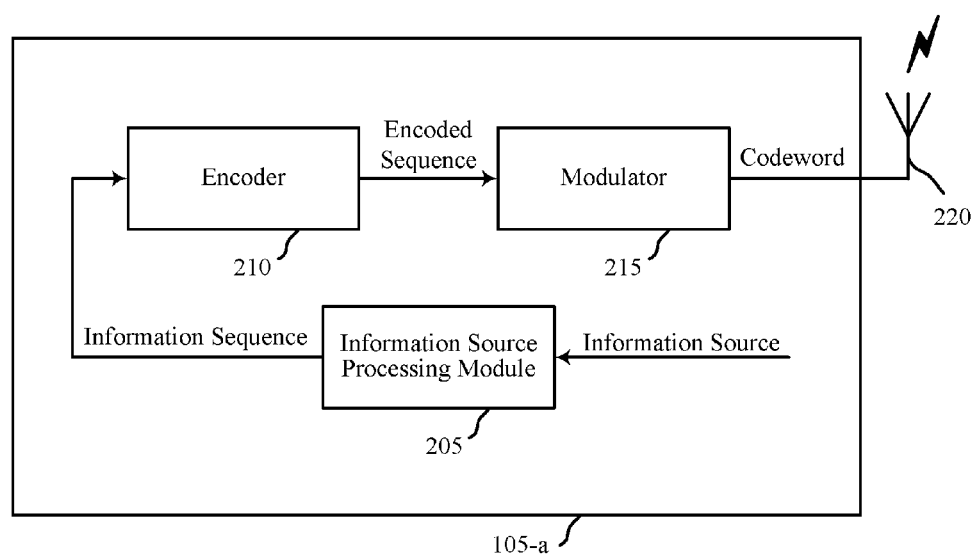
FIG. 2 shows a block diagram of a transmitter device illustrating various embodiments of the invention.

FIG. 2 is a block diagram 200 of a device 105-a which illustrates various embodiments. The device 105-a may be an example of a base station 105 of FIG. 1. In one configuration, the system at issue may use Quadrature Phase Shift Keying (QPSK). However, the present systems and methods may be implemented using a range of other modulation schemes.

The base station 105-a may include a number of transmitter components, which may include an information source processing module 205, an encoder 210, and a modulator 215. These components of the base station 105-a may, individually or collectively, be implemented with one or more Application Specific Integrated Circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors. The base station 105-a may include one or more memory units used for a variety of purposes.

In one configuration, the information source processing module 205 may process an information source. The output of the information source processing module 205 may be referred to as an information sequence. The encoder 210 may transform the information sequence outputted from the information source into an encoded sequence. The encoded sequence may be referred to as a codeword. The transformation process performed by the encoder 210 may occur after the information source is encoded, but prior to modulation.

Redundant information may be added by the encoder 210 to protect the information sequence against errors which may occur during transmission of the codeword. The redundant bit stream may be calculated from the information sequence. As a result, a correlation may exist between the original information sequence and the redundancy bit stream. This correlation may be used by a decoder to detect and correct errors that may be generated in the channel environment.

In one example, the modulator 215 may combine the encoded sequence from the encoder 210 with a carrier signal to render a plurality of symbols that include the codeword that are suitable for transmission. Typically, pilots are inserted into the stream of symbols. For example, the encoder 210 may be aware of a pattern of pilot symbols and may set a coding rate of the codeword to correlate to the number of symbols allocated to carry data. The coded bits representing the codeword may be modulated by the modulator 215 to produce data symbols, which may be interleaved with pilot symbols to occupy the available symbols. In another example, the encoder 210 may use a maximum number of symbols, regardless of symbol allocations. Data symbols may be punctured and replaced with pilot symbols of a known sequence.

The effect of inserting pilots as described above may result in an increase in the coding rate of the codeword, because less symbols are available to carry data regarding the codeword. In the first approach, the encoder 210 may set the coding rate according to the number of symbols available for data. In the second approach, data symbols are punctured and replaced with pilots, effectively increasing the coding rate.

In one embodiment, present systems and methods may minimize the increase in coding rates due to insertion of pilots by using pilot symbols that carry data (i.e., data modulated pilot symbols). Data modulated pilot symbols may be symbols that contain data in a location where a pilot symbol is expected to occur. In one example, different modulation and coding schemes (MCS) may be used for different symbols. In one example, pilot symbols may be replaced with data symbols modulated at a second, more reliable MCS. The second, more robust MCS may be selected by identifying the coded bit error rate (BER) sensitivity signal-to-noise ratio (SNR) level of the first (MCS) and choosing the second MCS for pilot modulation such that the uncoded symbol error rate (SER) may be less than 1% at the identified SNR level. In one example, the data modulated pilot symbols are modulated using a robust modulation scheme, such as Quadrature Phase Shift Keying (QSPK), while the data symbols are modulated using a modulation scheme with higher throughput, such as 64-bit Quadrature Amplitude Modulation (QAM). While QPSK and 64-bit QAM are used in this example, it is to be understood that other modulation and/or coding schemes may be used in accordance with the various systems and methods described here.

In some cases, the modulator 215 may combine the encoded sequence from the encoder 210 with a carrier signal to render symbols that include the codeword and are suitable for transmission according to the relevant standards and/or design parameters in place. Coded bits representing the codeword may be modulated by the modulator 215 to produce data symbols and/or data modulated pilot symbols. The modulation may occur using two or more different modulation and coding schemes. For example, the modulator 215 may encode and modulate data assigned to normal data symbols using a first modulation and coding scheme while encoding and modulating the data assigned to data modulated pilot symbols according to a second, more robust modulation and coding scheme. The encoder 210 and/or modulator 215 may be aware of a pattern of pilot symbols (e.g., as defined by a standard or predetermined according to a design implementation), and may place data that has been encoded and modulated according to the second modulation and coding scheme where normal pilot symbols would be expected according to the known pilot symbol pattern.

The data stream with data symbols and data modulated pilot symbols may be transmitted via an antenna 220 on a communication channel, such as a radio communication channel. The communication channel is subject to certain adverse influences, such as noise that may change the modulated signal.

Figure 3:
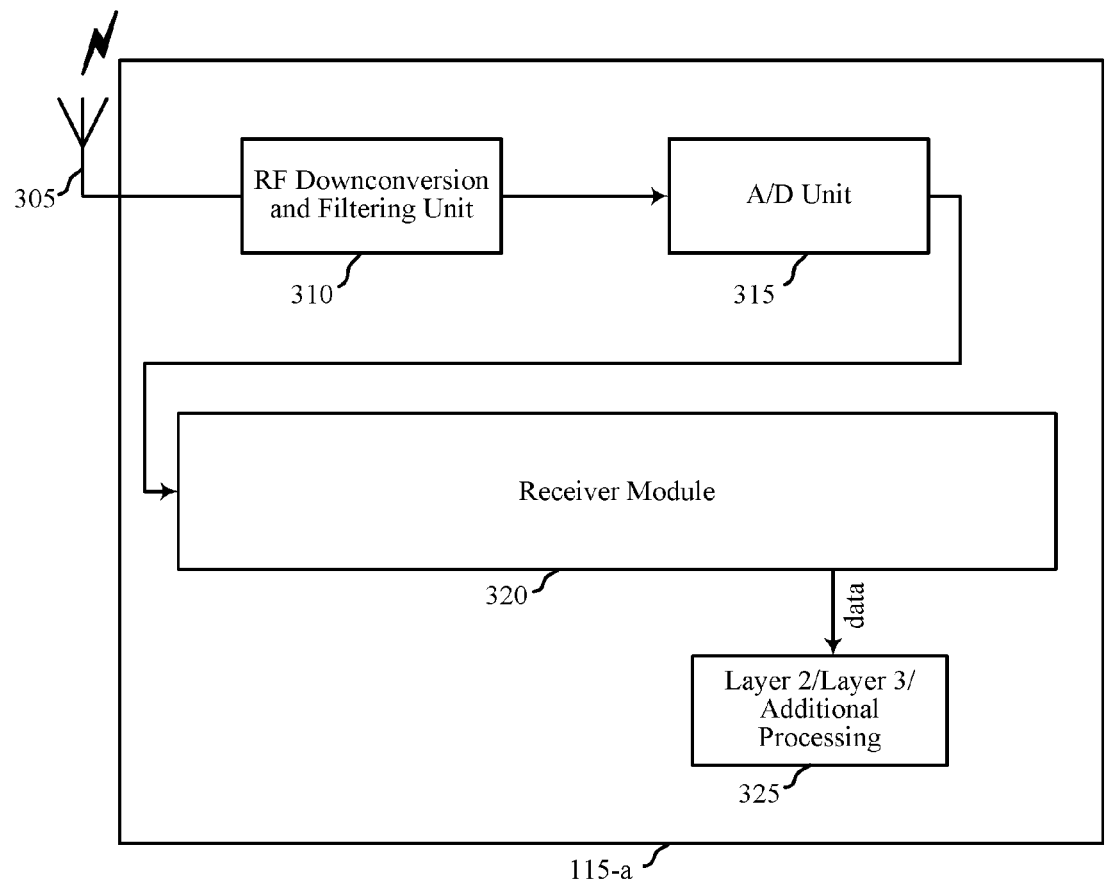
FIG. 3 shows a block diagram of a receiver device illustrating various embodiments of the present systems and methods.

Referring to FIG. 3, an example block diagram 300 of a device 115-a is shown which illustrates various embodiments of the present systems and methods. The device 115-a may be an example of a communications device 115 of FIG. 1. In one embodiment, the system at issue may use QPSK. However, the present systems and methods may be implemented using a range of other modulation schemes.

The device 115-a includes a number of receiver components, which may include: a radio frequency (RF) down-conversion and filtering unit 310, an analog to digital (A/D) unit 315, and a receiver module 320. These units of the device 115-a may, individually or collectively, be implemented with one or more Application Specific Integrated Circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors. The device 115-a may include one or more memory units (not shown) used for a variety of purposes.

In one embodiment, a radio frequency signal may be received via an antenna 305. The desired signal is selected and down-converted and filtered through the RF down-conversion and filtering unit 310. The output of the filtering unit 310 is the analog baseband (or passband at much lower frequency than the original radio frequency) signal, which is converted into a digital signal by the A/D unit 315. At the receiver module 320, the digital signal is received and processed to produce a stream of data. The receiver module 320 may also perform adaptive demodulation techniques on signals with data modulated pilot symbols according to embodiments of the present systems and methods.

The data stream may be forwarded to a layer 2/layer 3/additional processing unit 325 for further processing. In one embodiment, the components of the receiver module 320 may be implemented in a single PHY chip. In another embodiment, the RF down-conversion and filtering unit 310, A/D unit 315, and components of the receiver module 320 may be implemented in a single chip with RF and PHY functionality. The receiver module 320 may include components to adaptively select between different demodulation schemes for a plurality of symbols representing the transmitted codeword. The receiver module 320 may also include adaptive slicer logic to perform hard decision decoding on the data modulated symbols. Further, the receiver module 320 may include components to perform an adaptive log-likelihood ratio (LLR) generation technique to generate an adaptive number of LLRs for data symbols and data modulated pilot symbols included in the plurality of received symbols.

Figure 4:
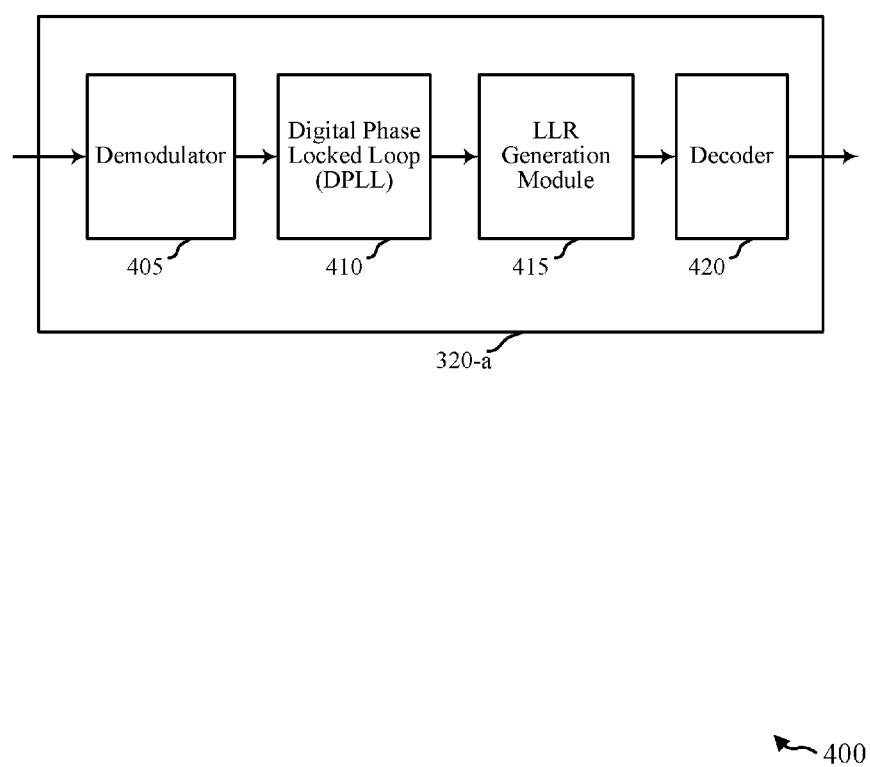
FIG. 4 is a block diagram illustrating one embodiment of a receiver module in accordance with the present systems and methods.

FIG. 4 is a block diagram illustrating one embodiment of a receiver module 320-a, in accordance with the present systems and methods. The receiver module 320-a may be an example of the receiver module 320 show in FIG. 3. The receiver module 320-a may include a demodulator 405, a DPLL 410, an LLR generation module 415, and a decoder 420. As previously explained, the receiver module 320-a may receive a signal that has been converted to a digital signal by the A/D unit 315.

These components of the receiver module 320-a may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

At the demodulator 405, the digital signal is received and processed to produce a stream of data. The demodulator unit 405 may perform symbol synchronization, Fast Fourier transform (FFT) processing, frequency offset correction and estimation, and equalizer functions in any variety of combinations known in the art. The demodulator 405 may adaptively switch between different demodulation schemes based on the MCS that was used at the transmitter on a symbol. As a result, the demodulator 405 may switch between different demodulation schemes while processing a plurality of symbols representing a single transmitted codeword. Further details regarding the demodulator 405 will be described below.

The demodulated data (e.g., a plurality of symbols representing the transmitted codeword) may be input to the DPLL 410. The DPLL 410 may determine a phase error of each symbol of the plurality of received symbols. The phase errors may be determined by comparing the angles of the received symbols to an estimation of symbols that were transmitted over the air to the device 115. The calculated phase errors may be used to calculate phase corrections. The phase corrections may correct the phase errors of the symbols of the plurality of received symbols.

In one example, the DPLL 410 may calculate the phase errors of each symbol of a current block of received symbols. The phase errors may be used to generate phase corrections. The phase corrections may be applied to correct the phase errors. In one embodiment, the phase correction for each symbol may be applied by derotating the corresponding symbol of a plurality of symbols according to the rotation value of the symbol's phase correction. The phase of the carrier may be recovered by applying the symbol's phase correction. Further details regarding the DPLL 410 will be described below.

In one embodiment, a plurality of phase-corrected symbols that represent a single transmitted codeword may be gathered from the output of the DPLL 410. A plurality of a priori LLRs may be computed from the plurality of phase-corrected symbols by the LLR generation module 415. The a priori LLRs may represent the bits of the transmitted codeword. In one embodiment, the LLR generation module 415 may generate LLRs for data symbols and the data modulated pilot symbols included in the plurality of received symbols.

The plurality of a priori LLRs may be inputted to a decoder 420. The decoder 420 may attempt to decode the codeword that was transmitted over the air to the device 115. The decoded codeword may be provided on a first output of the decoder 420. In addition, the decoder 420 may generate and provide a second output. The second output may include a plurality of a posteriori LLRs (soft LLRs) representing the bits of the transmitted codeword. The soft LLRs may be used to generate a plurality of symbols that represent an estimation of the plurality of transmitted symbols corresponding to the codeword. In one embodiment, symbols may be further processed by other components of the demodulator 405 and/or DPLL 410 before being forwarded to the decoder 420, and in some embodiments the transmitted data need not be encoded so there need not be a decoder 420.

Figure 5:
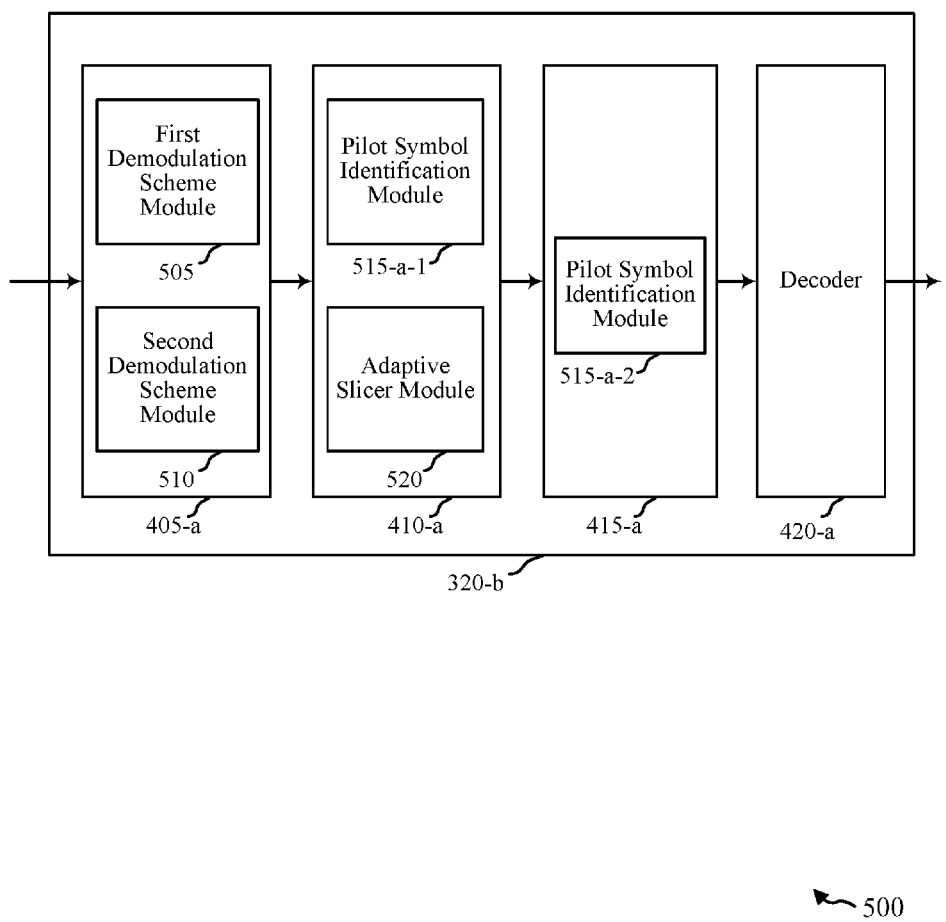
FIG. 5 is a block diagram illustrating one embodiment of a receiver module in accordance with the present systems and methods.

FIG. 5 is a block diagram illustrating one embodiment of a receiver module 320-b, in accordance with the present systems and methods. The receiver module 320-b may be an example of the receiver module 320 show in FIGS. 3 and/or 4. The receiver module 320-b may include a demodulator 405-a, a DPLL 410-a, an LLR generation module 415-a, and a decoder 420-a. As previously explained, the receiver module 320-b may receive a signal that has been converted to a digital signal by the A/D unit 315.

These components of the receiver module 320-b may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

In one configuration, the demodulator 405-a may include a first demodulation scheme module 505 and a second demodulation scheme module 510. These different demodulation schemes may be adaptively applied to a plurality of received symbols representing a transmitted codeword. For example, a first group of data symbols of the plurality of received symbols may have been modulated in a transmitter with a first MCS. A second group of data symbols within the plurality of received symbols may have been modulated with a second MCS at the transmitter. This second MCS may be a more reliable MCS than the first MCS. The second group of data symbols may occur in place of pilot symbols. Thus, the symbols within the second group of data symbols may be the data modulated pilot symbols. In some cases, the second group of data symbols occur in place of data symbols. The second group of data symbols may occur throughout the plurality of received symbols, such as in place of pilot symbols and/or data symbols. The demodulator 405-a may demodulate the plurality of received symbols by switching between different demodulation schemes depending on the MCS that was used to modulate the symbols at the transmitter.

In one example, the output of the demodulator 405-a may be input to the DPLL 410-a. In one configuration, the DPLL 410-*a* may process the plurality of received symbols to generate phase errors and phase corrections for the symbols. This may be performed by the angles of the received symbols being compared against a reference signal to determine the phase error of each symbol in the plurality of received symbols. The reference signal may include hard decision decoding results of the received symbols themselves. Because of noisy conditions that may exist at the receiver module 320-*b*, the hard decisions of data symbols calculated by the DPLL 410-*a* may be incorrect. As mentioned previously, pilot symbols have been inserted among the data symbols to reduce the occurrences of erroneous hard decisions. The use of pilot symbols, however, may cause the coding rate of the symbols to increase. The data modulated pilot symbols (used in place of the pilot symbols) may yield an improved accuracy of the hard decision while reducing the increase to the coding rate to maintain the throughput.

The DPLL 410-*a* may include a pilot symbol identification module 515-*a*-1 and an adaptive slicer module 520. The pilot symbol identification module 515-*a*-1 may identify when pilot symbols were expected to occur within the plurality of received symbols. As described above, in accordance with the present systems and methods, pilot symbols may be replaced with data modulated pilot symbols.

The adaptive slicer module 520 may quantize each of the symbols to a nearest ideal constellation point, which may be used as an estimation of the corresponding transmitted symbols. The output of the adaptive slicer module 520 may represent the hard decision result for a symbol as described above. In one configuration, the adaptive slicer module 520 may be adaptive based on the MCS used for each symbol at the transmitter. The adaptive capability of the adaptive slicer module 520 may allow different hard decision techniques to be used based on the MCS used at the transmitter for the symbols. For example, the adaptive slicer module 520 may use a first hard decision technique for data symbols that do not occur when pilot symbols are expected to occur. When the pilot symbol identification module 515-*a*-1 identifies a time during which a pilot symbol is expected, the adaptive slicer module 520 may use a second technique to perform hard decision on the data modulated pilot symbols. The hard decisions of the received symbols may be used to generate the phase errors and phase corrections of these symbols.

In one configuration, the output of the DPLL 410-*a* may include phase corrected symbols. These symbols may be collected and inputted to an LLR generation module 415-*a*. The LLR generation module 415-*a* may also include a pilot symbol identification module 515-*a*-2 to identify when the pilot symbols are expected to occur among the plurality of phase corrected symbols. The LLR generation module 415-*a* may generate a priori LLRs for each symbol of the plurality of received symbols. Typically, LLRs are not computed for pilot symbols inserted in a data stream. In accordance with the present systems and methods, pilot symbols are replaced with data modulated pilot symbols. As a result, LLRs may be calculated for each symbol of the plurality of received symbols. The LLR generation module 415-*a* may generate a first number of LLRs for data symbols and a second number of LLRs for the data modulated pilot symbols. As an example, the LLRs resulting from a data symbol may include 10 bits while the LLRs resulting from a data modulated pilot symbol may include 6 bits. The pilot symbol identification module 515-*a*-1 may indicate when a data modulated pilot symbol is occurring and the second number of LLRs may be generated (e.g., 6 bits).

The LLRs generated from the plurality of phase corrected symbols may represent the bits of the transmitted code word. These LLRs may be fed into the decoder 420-*a*. The decoder 420-*a* may use the LLRs to attempt to decode the transmitted codeword.

Figure 6:
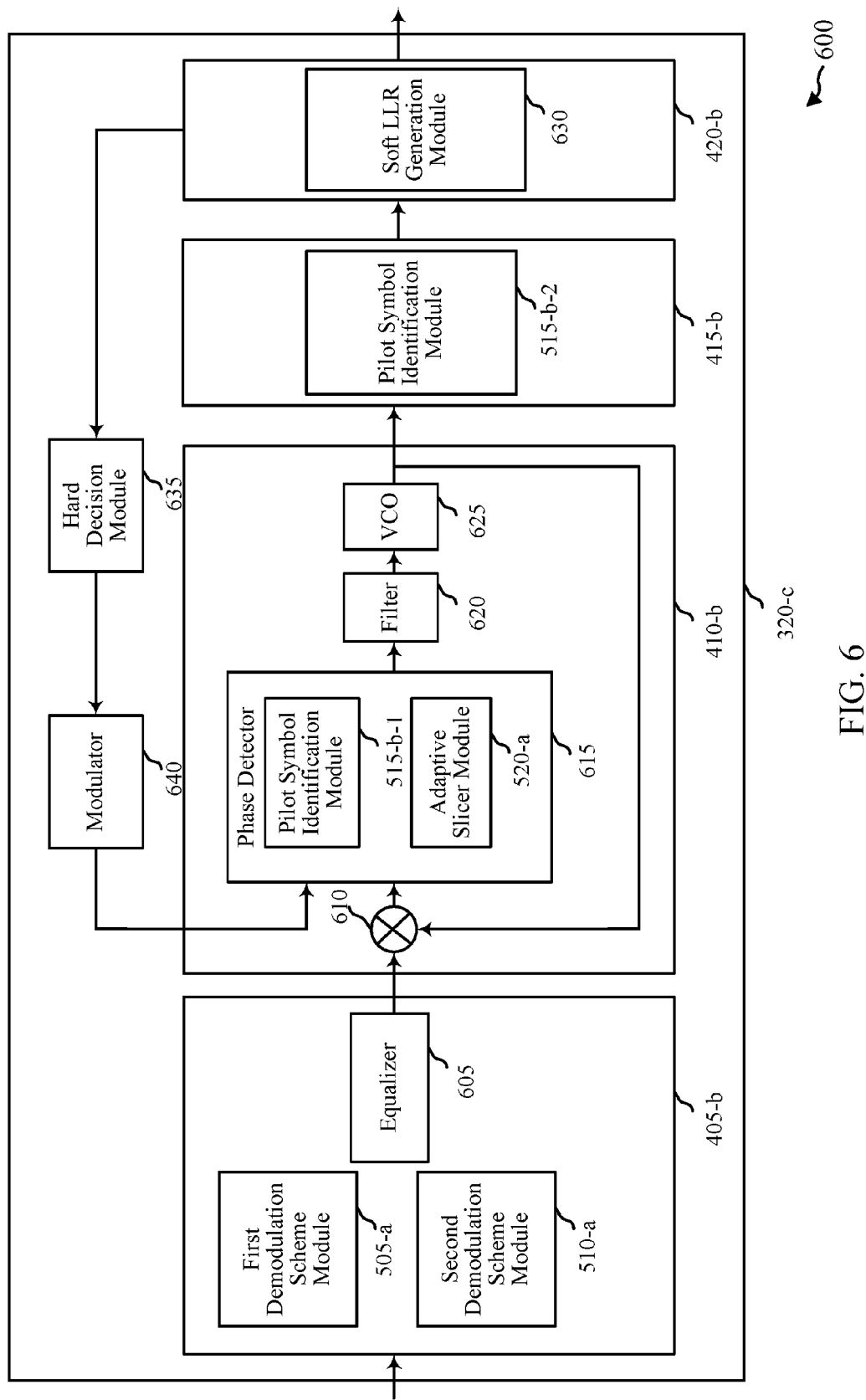
FIG. 6 is a block diagram illustrating one example of a receiver module that may implement the present systems and methods.

FIG. 6 is a block diagram illustrating one example of a receiver module 320-*c* that may implement the present systems and methods. In one embodiment, the receiver module 320-*c* may be an example of the receiver module 320 illustrated in FIGS. 3, 4, and/or 5. The receiver module 320-*c* may include a demodulator 405-*b*, a DPLL 410-*b*, an LLR generation module 415-*a*, and a decoder 420-*b*, as previously described. In addition, the receiver module 320-*c* may include a hard decision module 635 and a modulator 640.

These components of the receiver module 320-*c* may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

In one configuration, the demodulator 405-*b* may perform various processes on incoming symbols. For example, the demodulator 405-*b* may adaptively switch between different demodulation schemes (e.g., by selecting different modulation scheme modules 505-*a*, 510-*a*) based on the MCS used on the incoming symbols at the transmitter. The demodulator 405-*b* may also include an equalizer 605 to perform equalization techniques on symbols of a received signal. The output of the equalizer 605 (e.g., equalized symbols) may be input to the DPLL 410-*b*. While FIG. 6 illustrates the output of the equalizer 605 being fed into the DPLL 410-*b*, it is to be understood that other implementations may be used. For example, the DPLL 410-*b* may perform processing on unequalized symbols and the equalizer 605 may be placed after the DPLL 410-*b* in the chain of components of the receiver module 320-*c*. The DPLL 410-*b* may include a rotator 610, a phase detector 615, a filter 620, and a voltage controlled oscillator (VCO) 625. The DPLL 410-*b* may be a closed-loop frequency-control system based on a phase difference between an input signal and a feedback signal of the VCO 625.

In one configuration, the DPLL 410-*b* may perform one or more iterations on a plurality of symbols. Each received plurality of symbols may represent a single codeword transmitted to the device 115. The symbols may be constellation points in a QPSK signal that have been rotated according to a random phase caused by the phase noise and frequency offset of one or more oscillators in the device 115. In one example, the symbols may be derotated by the rotator 610. The rotator 610 may derotate the symbols according to phase correction values generated by the DPLL 410-*b*. The phase corrections may be fed back from the VCO 625 to the rotator 610. The derotated symbols may be passed to the phase detector 615.

The phase detector (or phase comparator) 615 may be a frequency mixer, analog multiplier, or logic circuit that generates a voltage signal which represents the difference in phase between two signal inputs. For example, hard decisions may be performed on the incoming samples. These hard decisions may represent estimations of the corresponding transmitted symbols. The angles of the incoming symbols may be compared to the estimations of the transmitted symbols based on the hard decisions of the incoming symbols themselves to determine the phase errors of the incoming symbols. In one configuration, the phase detector 615 may include a pilot symbol identification module 515-*b*-1 that may identify when a pilot symbol is expected to occur among the plurality of received symbols.

When pilot symbols are not expected to occur, an adaptive slicer module 520-*a* may perform hard decision techniques on the data symbols. In one example, the adaptive slicer module 520-*a* may access a first look-up table (LUT) to determine the nearest ideal constellation point for each data symbol. The first look-up table may be associated with a first MCS that was used on the data symbols at the transmitter. In some cases when pilot symbols are not expected to occur, the adaptive slicer module 520-*a* may use a first slicer non-LUT function to perform a hard decision. For example, the adaptive slicer module 520-*a* may use a bit truncation of soft symbols to their nearest constellation symbols or any other comparator and/or decision logic that yields selecting the closest constellation symbol for each soft symbol.

When the pilot symbol identification module 515-*b*-1 indicates that a pilot symbol is expected to occur, the adaptive slicer module 520-*a* may adaptively switch to access a second look-up table that is associated with a second MCS, which is a more reliable MCS than the first MCS. The second look-up table may be accessed to determine the nearest ideal constellation points for the data modulated pilot symbols, which are being used in place of the pilot symbols. In some cases when pilot symbols are expected to occur, the adaptive slicer module 520-*a* may use a second slicer non-LUT function to perform a hard decision. For example, the adaptive slicer module 520-*a* may use a bit truncation of soft symbols to their nearest constellation symbols, or any other comparator and/or decision logic that yields selecting the closest constellation symbol for each soft symbol. Because the MCS used on these data modulated pilot symbols is more robust, the hard decisions of these symbols are less prone to errors than the hard decisions of the data symbols.

As an example, 1024 Quadrature Amplitude Modulation (QAM) may be the MCS used for the data symbols at the transmitter and 64QAM may be used for the data modulated pilot symbols. While 1024QAM and 64QAM are used in this example, it is to be understood that other MCS may be used in accordance with the various systems and methods described here.

The Euclidian distance between constellation points in 1024QAM is approximately four times shorter than the Euclidian distance between constellation points in 64QAM. As a result, the probability of the phase detector 615 to produce an erroneous hard decision in 1024QAM, for a given SNR, may be greater than in 64QAM. In one example, instead of transmitting a pilot of known sequence, a 64QAM data symbol may be transmitted. In the phase detector 615 of the receiver module 320-*c*, a hard decision may be taken on that 64QAM symbol, which may be less likely to be erroneous than the hard decision taken on a 1024QAM data symbol. Thus, the accuracy of the phase errors and corrections generated by DPLL 410-*b* may increase.

As stated above, the phase detector 615 may detect the difference in phase and frequency between a reference signal (e.g., estimation of transmitted symbols based on hard decisions of received symbols) and a feedback signal (e.g., a signal input received from the VCO 625). The phase detector 615 may generate an "up" or "down" control signal based on whether the feedback frequency is lagging or leading the reference frequency. These "up" or "down" control signals may determine whether the VCO 625 needs to operate at a higher or lower frequency, respectively.

The filter 620 may convert these control signals to a control voltage that is used to bias the VCO 625. Based on the control voltage, the VCO 625 oscillates at a higher or lower frequency, which affects the phase and frequency of the feedback from the VCO 625. If the phase detector 615 produces an up signal, then the frequency of the VCO 625 may increase. A down signal decreases the frequency of the VCO 625. The VCO 625 may stabilize once the reference signal and the feedback signal have the same phase and frequency.

In one configuration, in addition to using data modulated pilot symbols to generate accurate hard decisions to generate an accurate estimation of the transmitted symbols, the output of the decoder 420-*b* may be utilized to generate the estimation of the transmitted symbols. In one embodiment, the output of the DPLL 410-*b*, which includes a plurality of phase-corrected (derotated) symbols that represent a transmitted codeword, may be used to generate a plurality of LLRs that represent the bits of the transmitted codeword. This plurality of LLRs may be fed to the decoder 420-*b*. LLRs may be generated for both the data symbols and the data modulated pilot symbols, as described previously. The decoder 420-*a* may implement a forward error correction (FEC) scheme to correct errors that may be present in the generated LLRs. The decoder 420-*b* may be a convolutional turbo code (CTC) decoder, a low-density parity-check (LDPC) decoder, and the like.

In one configuration, the decoder 420-*b* may produce a first output of hard decoded bits with a low bit error rate (BER) due to the coding gain of the decoder 420-*b*. The decoded bits may correspond to the bits that were modulated at a transmitting device to generate symbols that were transmitted over the air to the device 115. In one example, the decoder may include a soft LLR generation module 630. At an additional output of the decoder 420-*b*, the soft LLR generation module 630 may generate a number of soft a posteriori LLRs which mimic a number of transmitted bits that were modulated in the transmitter device (e.g., the base station 105). The soft LLRs may be hard decoded and remodulated to generate a plurality of symbols that represent the plurality of symbols transmitted over the air to the device 115. As a result, the additional output of the decoder 420-*b* may include interleaved symbols in a similar sequence that are substantially similar to symbols that were transmitted over the air to the device 115.

In one example, the hard decision module 635 may perform hard decision decoding on the soft LLRs. The soft LLRs may be remodulated by the modulator 640 to generate an hypothesis of the transmitted symbols. This hypothesis may be fed back to the phase detector 615 as reference symbols. In one configuration, QAM techniques may be performed on the hard decoded soft LLRs to generate the hypothesis of the symbols that were transmitted over the air.

Using the feedback of the decoder 420-*b*, the DPLL 410-*c* may run a second iteration on the plurality of received symbols to determine the phase errors of these symbols based on the estimation of the corresponding transmitted symbols. When the plurality of received symbols are fed to the phase detector 615 during the second iteration, the detector 615 may determine the phase errors of the symbols by comparing the angles of the symbols with the angles of the reference symbols received from the feedback loop of the decoder 420-b. The reference symbols may represent an estimation of the symbols that were transmitted over the air to the device 115. Based on the generated phase errors of the received symbols, phase corrections may be generated for the symbols of the plurality of received symbols. In one embodiment, the DPLL 410-b may run a single iteration on a plurality of received symbols when data modulated pilot symbols are used in lieu of pilot symbols.

Figure 7:
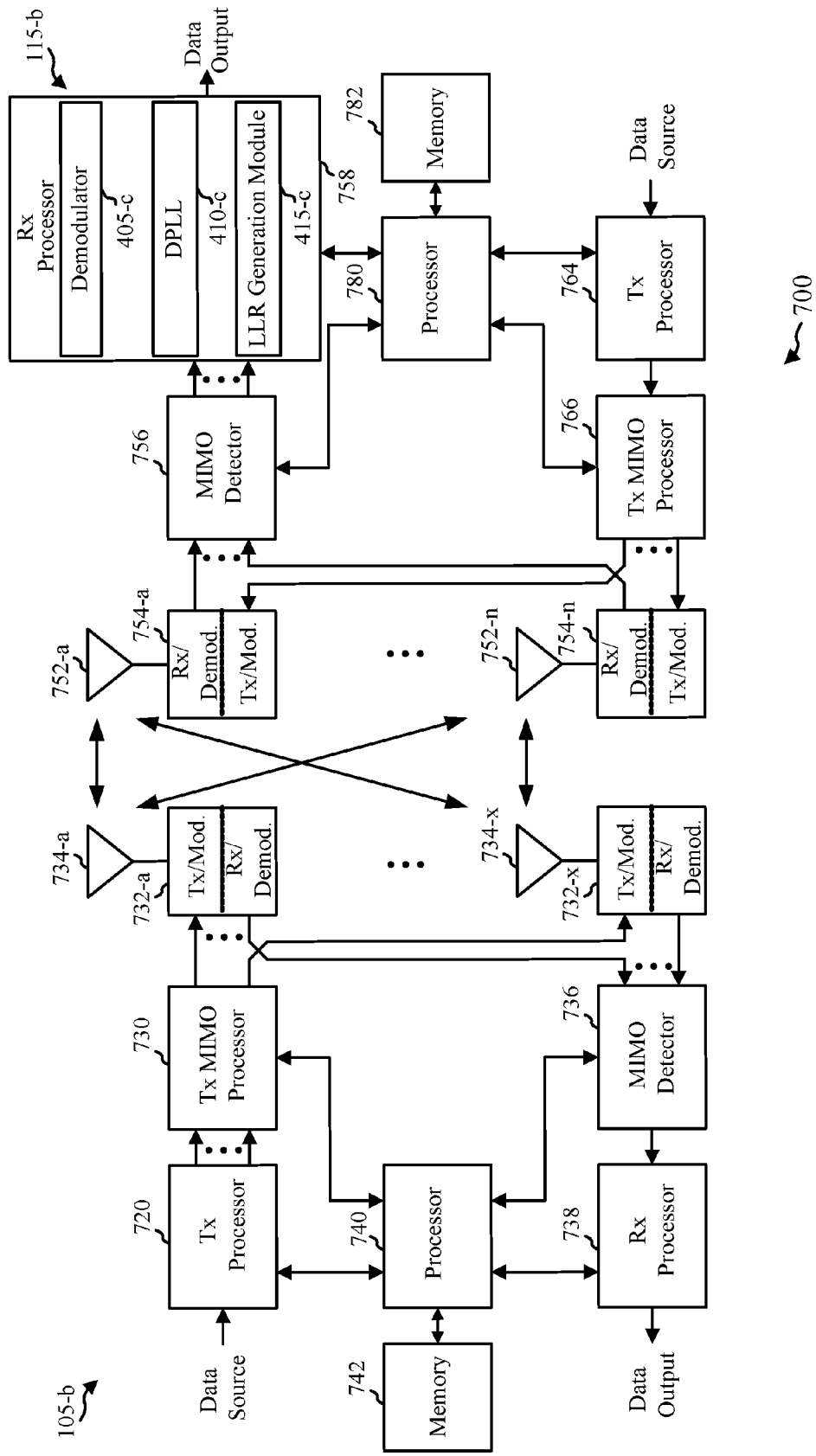
FIG. 7 is a block diagram of a system including a base station and a mobile device.

FIG. 7 is a block diagram of a system 700 including a base station 105-b and a mobile device 115-b. This system 700 may be an example of the system 100 of FIG. 1. The base station 105-b may be equipped with antennas 734-a through 734-x, and the mobile device 115-b may be equipped with antennas 752-a through 752-n. At the base station 105-b, a transmit processor 720 may receive data from a data source.

The transmit processor 720 may process the data. The transmit processor 720 may also generate reference symbols, and a cell-specific reference signal. A transmit (TX) MIMO processor 730 may perform spatial processing (e.g., precoding) on data symbols, control symbols, and/or reference symbols, if applicable, and may provide output symbol streams to the transmit modulator/demodulators 732-a through 732-x. Each base station modulator/demodulator 732 may process a respective output symbol stream to obtain an output sample stream. Each base station modulator/demodulator 732 may further process (e.g., convert to analog, amplify, filter, and upconvert) the output sample stream to obtain a downlink (DL) signal. In one example, DL signals from base station modulator/demodulators 732-a through 732-x may be transmitted via the antennas 734-a through 734-x, respectively.

At the mobile device 115-b, the mobile device antennas 752-a through 752-n may receive the DL signals from the base station 105-b and may provide the received signals to the mobile device modulator/demodulators 754-a through 754-n, respectively. Each mobile device modulator/demodulator 754 may condition (e.g., filter, amplify, downconvert, and digitize) a respective received signal to obtain input samples. Each mobile device modulator/demodulator 754 may further process the input samples to obtain received symbols. A MIMO detector 756 may obtain received symbols from all the mobile device modulator/demodulators 754-a through 754-n, perform MIMO detection on the received symbols if applicable, and provide detected symbols. A receive processor 758 may process (e.g., demodulate, deinterleave, and decode) the detected symbols, providing decoded data for the mobile device 115-b to a data output, and provide decoded control information to a processor 780, or memory 782.

On the uplink (UL), at the mobile device 115-b, a transmit processor 764 may receive and process data from a data source. The transmit processor 764 may also generate reference symbols for a reference signal. The symbols from the transmit processor 764 may be precoded by a transmit MIMO processor 766 if applicable, further processed by the mobile device modulator/demodulators 754-a through 754-n (e.g., for SC-FDMA, etc.), and be transmitted to the base station 105-b in accordance with the transmission parameters received from the base station 105-b. At the base station 105-b, the UL signals from the mobile device 115-b may be received by the antennas 734, processed by the transmit modulator/demodulators 732, detected by a MIMO detector 736 if applicable, and further processed by a receive processor. The receive processor 738 may provide decoded data to a data output and to the processor 740. In one configuration, the receive processor 758 may include a demodulator 405-c, a DPLL 410-c, and an LLR generation module 415-c to implement the systems and methods described herein. The demodulator 405-c, DPLL 410-c, and LLR generation module 415-c may be examples of the demodulator 405-c, DPLL 410-c, and an LLR generation module 415-c described in FIGS. 4, 5, and/or 6. The components of the mobile device 115-b may, individually or collectively, be implemented with one or more Application Specific Integrated Circuits (ASICs) adapted to perform some or all of the applicable functions in hardware. Each of the noted modules may be a means for performing one or more functions related to operation of the system 700. Similarly, the components of the base station 105-b may, individually or collectively, be implemented with one or more Application Specific Integrated Circuits (ASICs) adapted to perform some or all of the applicable functions in hardware. Each of the noted components may be a means for performing one or more functions related to operation of the system 700.

Figure 8:
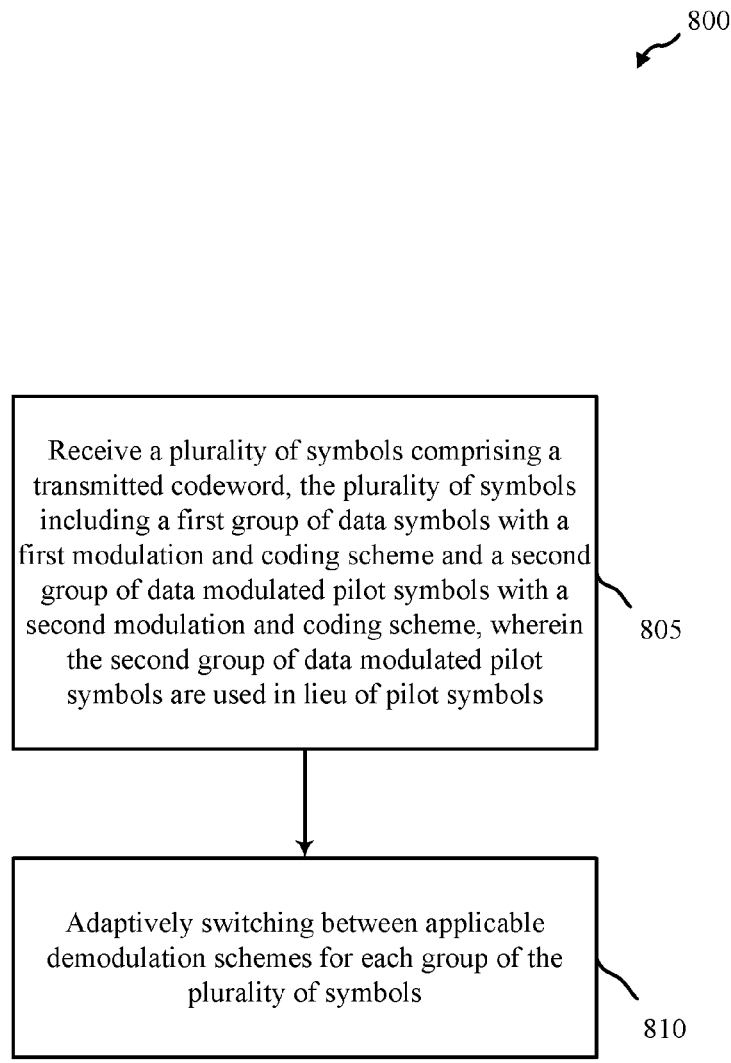
FIG. 8 is a flow chart illustrating one example of a method to mitigate an undesirable increase in a coding rate of a wireless communication signal in accordance with the present systems and methods.

FIG. 8 is a flow chart illustrating one example of a method 800 to mitigate an unwanted increase in a coding rate of a wireless communication signal in accordance with the present systems and methods. For clarity, the method 800 is described below with reference to the mobile device 115 of FIGS. 1, 3, and/or 7. In one implementation, the receiver module 320 of FIGS. 3, 4, 5 and/or 6 may execute one or more sets of codes to control the functional elements of the mobile device 115 to perform the functions described below.

In one configuration, at block 805, a plurality of symbols including a transmitted codeword may be received. The plurality of symbols may include a first group of data symbols with a first MCS and a second group of data modulated pilot symbols with a second MCS. A carrier phase error may be determined based at least in part on the second group of data modulated pilot symbols. The second MCS may be a more reliable, robust MCS than the first MCS. The second group of data symbols may be used instead of pilot symbols. At block 810, switching between applicable demodulation schemes may adaptively occur for each group of the plurality of symbols.

Therefore, the method 800 may provide for the minimization of a coding rate because data symbols of a data stream are not replaced with pilot symbols, which do not carry data. Instead, data modulated pilot symbols are used to carry data. Thus, the coding rate may be lower than if pilot symbols replaced data symbols. It should be noted that the method 800 is just one implementation and that the operations of the method 800 may be rearranged or otherwise modified such that other implementations are possible.

Figure 9:
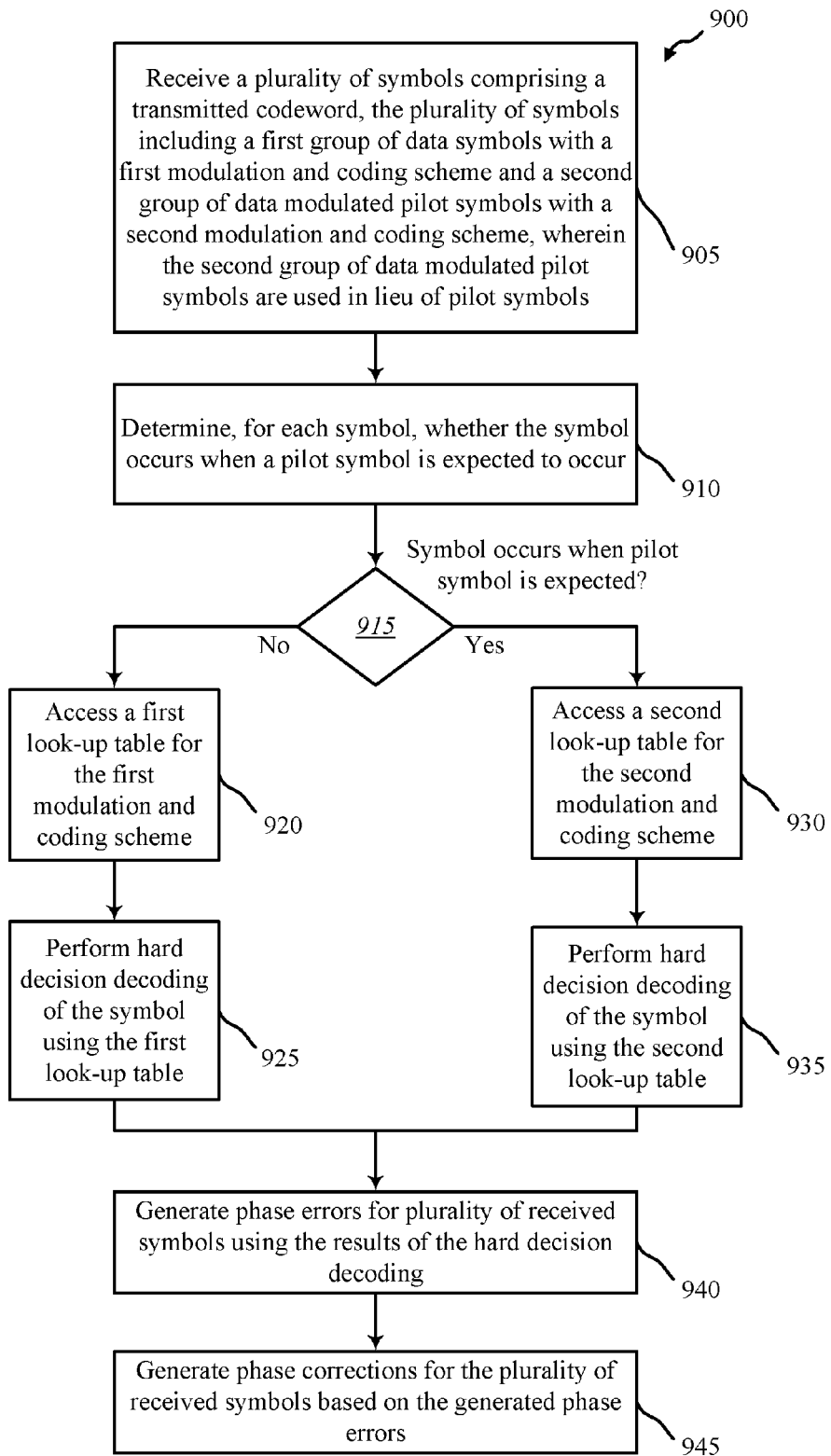
FIG. 9 is a flow chart illustrating one example of a method to improve accuracy of hard decisions of symbols of a wireless communication signal in accordance with the present systems and methods.

FIG. 9 is a flow chart illustrating one example of a method 900 to improve accuracy of hard decisions of symbols of a wireless communication signal in accordance with the present systems and methods. For clarity, the method 900 is described below with reference to the mobile device 115 of FIGS. 1, 3, and/or 7. In one implementation, the receiver module 320 of FIGS. 3, 4, 5 and/or 6 may execute one or more sets of codes to control the functional elements of the mobile device 115 to perform the functions described below.

In one configuration, at block 905, a plurality of symbols including a transmitted codeword may be received. The plurality of symbols may include a first group of data symbols with a first MCS and a second group of data modulated pilot symbols with a second MCS. A carrier phase error may be determined based at least in part on the second group of data modulated pilot symbols. The second MCS may be a more reliable, robust MCS than the first MCS. The second group of data symbols may be used instead of pilot symbols. At block 910, a determination may be made for each symbol as to whether the symbol occurs when a pilot symbol is expected to occur. If, at decision 915, a symbol does not occur when a pilot symbol is expected, a first look-up table for the first MCS may be accessed at block 920. At block 925, hard decision decoding may be performed on the symbol using the first look-up table. In some cases, at block 920 and 925 a first non-LUT function may be used for hard decision decoding on the symbol. If, however, it is determined that the symbol occurs when a pilot symbol is expected to occur, a second look-up table for the second MCS is accessed at block 930. Hard decision decoding of the symbol is performed at block 935 using the second look-up table. In some cases, at block 930 and 935 a second non-LUT function may be used for hard decision decoding on the symbol.

At block 940, phase errors are generated for the plurality of received symbols using the results of the hard decision decoding. At block 945, phase corrections are generated for the plurality of received symbols based on the generated phase errors.

Therefore, the method 900 may provide for accurate hard decisions of symbols by using data modulated pilot. It should be noted that the method 900 is just one implementation and that the operations of the method 900 may be rearranged or otherwise modified such that other implementations are possible.

Figure 10:
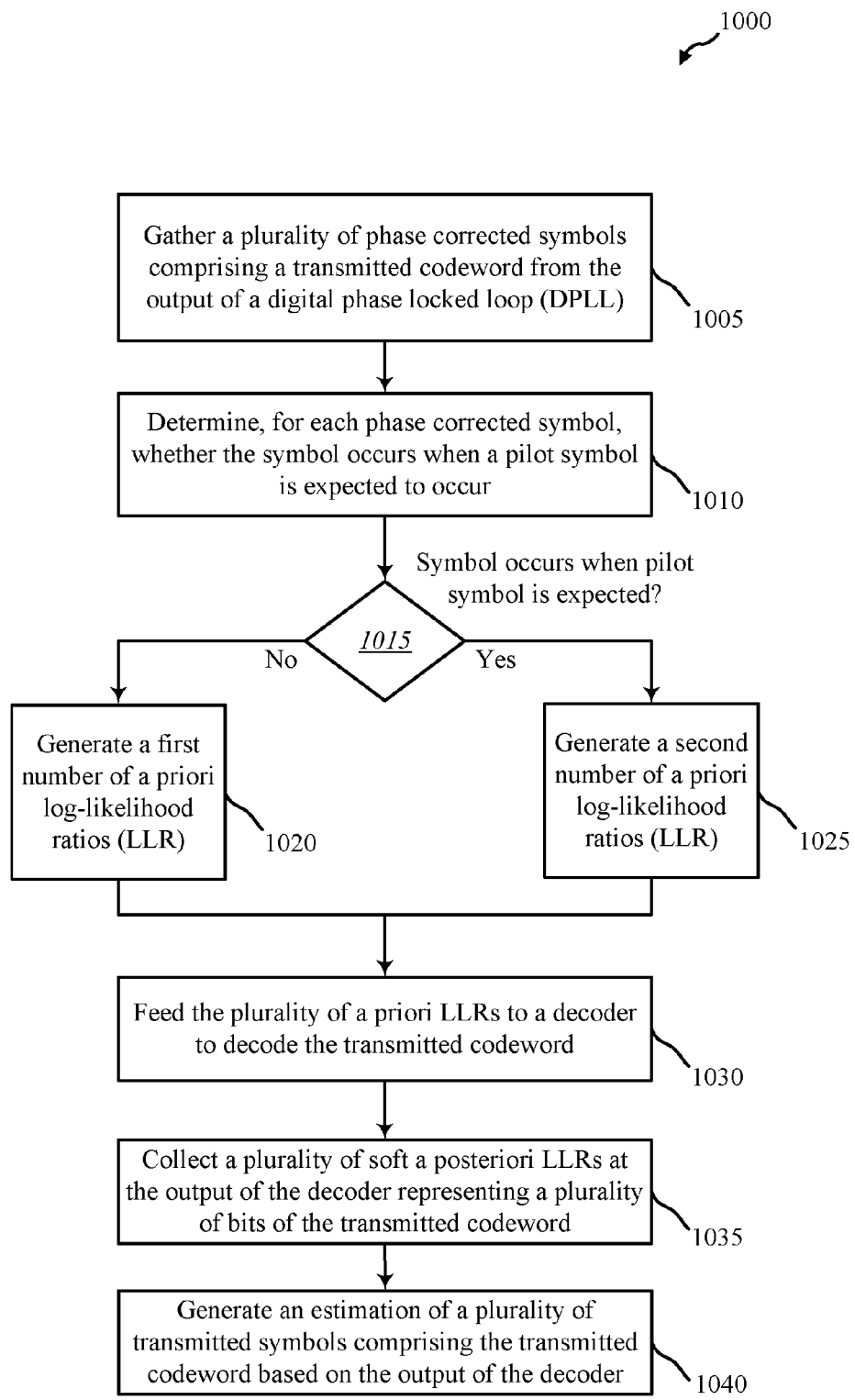
FIG. 10 is a flow chart illustrating one example of a method to improve the decoding of a codeword in accordance with the present systems and methods.

FIG. 10 is a flow chart illustrating one example of a method 1000 to improve the decoding of a codeword in accordance with the present systems and methods. For clarity, the method 1000 is described below with reference to the mobile device 115 of FIGS. 1, 3, and/or 7. In one implementation, the receiver module 320 of FIGS. 3, 4, 5 and/or 6 may execute one or more sets of codes to control the functional elements of the mobile device 115 to perform the functions described below.

In one configuration, at block 1005, a plurality of phase corrected symbols are gathered together. The phase corrected symbols may include a transmitted codeword. The phase corrected symbols may be gathered at the output of the DPLL 410.

At block 1010, a determination may be made for each phase corrected symbol whether the symbol occurs when a pilot symbol is expected to occur. If, at decision, 1015, it is determined that the symbol does not occur when a pilot is expected, at block 1020, a first number of a priori LLRs may be generated from the symbol. If, however, it is determined that the symbol does occur when a pilot symbol is expected, at block 1025, a second number of a priori LLRs may be generated from that symbol.

At block 1030, the plurality of LLRs may be fed to a decoder to decode the transmitted codeword. At block 1035, a plurality of soft a posteriori LLRs may be generated at the output of the decoder. The soft LLRs may represent a plurality of bits of the transmitted codeword. At block 1040, an estimation of a plurality of transmitted symbols may be generated based on the output of the decoder (e.g., the soft LLRs).

Therefore, the method 1000 may improve the decoding of a transmitted codeword by generating a priori LLRs for each symbol in the plurality of received symbols. It should be noted that the method 1000 is just one implementation and that the operations of the method 1000 may be rearranged or otherwise modified such that other implementations are possible.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM☐, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description below, however, describes an LTE system for purposes of example, and LTE terminology is used in much of the description below, although the techniques are applicable beyond LTE applications.

Examples of Radio Access Technologies employing CDMA techniques include CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. Examples of TDMA systems include various implementations of Global System for Mobile Communications (GSM). Examples of Radio Access Technologies employing FDMA and/or OFDMA include Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies.

The description provided above provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

The detailed description set forth above in connection with the appended drawings describes exemplary embodiments and does not represent the only embodiments that may be implemented or that are within the scope of the claims. The term "exemplary" used throughout this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method for wireless communication, comprising:
   identifying a coded bit error rate (BER) sensitivity signal-to-noise ratio (SNR) level of a first modulation and coding scheme;
   selecting a second modulation and coding scheme based at least in part on the identified coded BER SNR level of the first modulation and coding scheme;
   generating a codeword comprising a plurality of symbols, the plurality of symbols including a first group of symbols comprising data symbols with the first modulation and coding scheme and a second group of symbols comprising data modulated pilot symbols with the selected second modulation and coding scheme, wherein the second group of data modulated pilot symbols are used in lieu of pilot symbols; and
   transmitting the codeword, wherein transmitting the codeword comprises switching between the first modulation and coding scheme and the selected second modulation and coding scheme for the first group of symbols and the second group of symbols.

2. The method of claim 1, wherein the selected second modulation and coding scheme is more robust than the first modulation and coding scheme.

3. The method of claim 1, wherein the second group of symbols is transmitted at a lower bit rate than the first group of symbols.

4. The method of claim 1, wherein switching between the first modulation and coding scheme and the selected second modulation and coding scheme comprises:
   placing data symbols that have been encoded and modulated according to the selected second modulation and coding scheme where pilot symbols would be expected according to a predefined pilot symbol pattern.

5. The method of claim 1, wherein selecting the second modulation and coding scheme further comprises:

selecting the second modulation and coding scheme such that an uncoded symbol error rate (SER) is less than 1% at the identified BER SNR level.

6. A transmitting device configured to mitigate an unwanted increase in a coding rate of a wireless communication signal comprising:
a processor;
memory in electronic communication with the processor; and
instructions stored in the memory, the instructions being executable by the processor to:
identify a coded bit error rate (BER) sensitivity signal-to-noise ratio (SNR) level of the first modulation and coding scheme;
select the second modulation and coding scheme based at least in part on the identified coded BER SNR level of the first modulation and coding scheme;
generate a codeword comprising a plurality of symbols, the plurality of symbols including a first group of symbols comprising data symbols with the first modulation and coding scheme and the selected second group of symbols comprising data modulated pilot symbols with a second modulation and coding scheme, wherein the second group of data modulated pilot symbols are used in lieu of pilot symbols; and
transmit the codeword, wherein transmitting the codeword comprises switching between the first modulation and coding scheme and the selected second modulation and coding scheme for the first group of symbols and the second group of symbols.

7. The device of claim 6, wherein the selected second modulation and coding scheme is more robust than the first modulation and coding scheme.

8. The device of claim 6, wherein the second group of symbols is transmitted at a lower bit rate than the first group of symbols.

9. The device of claim 6, wherein when the processor switches between the first modulation and coding scheme and the selected second modulation and coding scheme, the instructions are further executable by the processor to:
place data symbols that have been encoded and modulated according to the selected second modulation and coding scheme where pilot symbols would be expected according to a predefined pilot symbol pattern.

10. The device of claim 6, wherein when the processor selects the second modulation and coding scheme, the instructions are further executable by the processor to:
select the second modulation and coding scheme such that an uncoded symbol error rate (SER) is less than 1% at the identified BER SNR level.

11. A transmitting device configured to mitigate an unwanted increase in a coding rate of a wireless communication signal comprising:
means for identifying a coded bit error rate (BER) sensitivity signal-to-noise ratio (SNR) level of a first modulation and coding scheme;
means for selecting a second modulation and coding scheme based at least in part on the identified coded BER SNR level of the first modulation and coding scheme;
means for generating a codeword comprising a plurality of symbols, the plurality of symbols including a first group of symbols comprising data symbols with the first modulation and coding scheme and a second group of symbols comprising data modulated pilot symbols with the selected second modulation and coding scheme, wherein the second group of data modulated pilot symbols are used in lieu of pilot symbols; and
means for transmitting the codeword, wherein transmitting the codeword comprises switching between the first modulation and coding scheme and the selected second modulation and coding scheme for the first group of symbols and the second group of symbols.

12. The device of claim 11, wherein the selected second modulation and coding scheme is more robust than the first modulation and coding scheme.

13. The device of claim 11, wherein the second group of symbols is transmitted at a lower bit rate than the first group of symbols.

14. The device of claim 11, wherein the means for transmitting the codeword comprises:
means for placing data symbols that have been encoded and modulated according to the selected second modulation and coding scheme where pilot symbols would be expected according to a predefined pilot symbol pattern.

15. A non-transitory computer-readable medium storing computer-executable code for configuring mitigation of an unwanted increase in a coding rate of a wireless communication signal, the code comprising instructions executable by a processor for:
identifying a coded bit error rate (BER) sensitivity signal-to-noise ratio (SNR) level of a first modulation and coding scheme;
selecting a second modulation and coding scheme based at least in part on the identified coded BER SNR level of the first modulation and coding scheme;
generating a codeword comprising a plurality of symbols, the plurality of symbols including a first group of symbols comprising data symbols with the first modulation and coding scheme and the selected second group of symbols comprising data modulated pilot symbols with a second modulation and coding scheme, wherein the second group of data modulated pilot symbols are used in lieu of pilot symbols; and
transmitting the codeword, wherein transmitting the codeword comprises switching between the first modulation and coding scheme and the selected second modulation and coding scheme for the first group of symbols and the second group of symbols.

\* \* \* \* \*